United States Patent
Yang

(10) Patent No.: US 7,187,320 B1
(45) Date of Patent: Mar. 6, 2007

(54) MATCHED MANEUVER DETECTOR

(75) Inventor: Robert E. Yang, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 194 days.

(21) Appl. No.: 10/928,853

(22) Filed: Aug. 27, 2004

(51) Int. Cl.
- G01S 13/66 (2006.01)
- G01S 13/06 (2006.01)
- G01S 15/06 (2006.01)
- G01S 15/66 (2006.01)
- G01S 17/06 (2006.01)
- G01S 17/66 (2006.01)
- G01S 13/00 (2006.01)
- G01S 15/00 (2006.01)
- G01S 17/00 (2006.01)

(52) U.S. Cl. ............................. 342/74; 342/73; 342/75; 342/77; 342/89; 342/94; 342/95; 342/104; 342/106; 342/109; 342/118; 342/175; 342/195; 367/87; 367/89; 367/95; 367/99; 367/103

(58) Field of Classification Search ................... 342/29, 342/36, 59, 62, 63, 67, 73–103, 104–115, 342/118, 133, 175, 195, 450–465; 367/87–116; 356/4.01–5.15
See application file for complete search history.

(56) References Cited

U.S. PATENT DOCUMENTS

| | | | |
|---|---|---|---|
| 3,135,053 A * | 6/1964 | Newman et al. ............... 342/67 |
| 3,646,588 A * | 2/1972 | Van Popta ................... 342/96 |
| 3,869,601 A * | 3/1975 | Metcalf ...................... 342/450 |
| 4,038,536 A | 7/1977 | Feintuch |
| 4,038,657 A * | 7/1977 | Orloff .......................... 342/95 |
| 4,128,837 A * | 12/1978 | Page ............................ 342/67 |
| 4,179,696 A * | 12/1979 | Quesinberry et al. ......... 342/75 |
| 5,291,199 A * | 3/1994 | Overman et al. ............ 342/175 |
| 5,422,829 A * | 6/1995 | Pollock ....................... 342/133 |
| 5,428,562 A | 6/1995 | Gay |
| 5,451,960 A * | 9/1995 | Kastella et al. ................ 342/59 |
| 5,533,067 A | 7/1996 | Jamal et al. |
| 5,537,118 A * | 7/1996 | Appriou ....................... 342/95 |
| 5,604,683 A * | 2/1997 | Roecker ...................... 342/450 |
| 5,631,653 A * | 5/1997 | Reedy .......................... 342/62 |
| 5,638,281 A * | 6/1997 | Wang ........................... 342/29 |
| 5,727,032 A | 3/1998 | Jamal et al. |
| 5,751,777 A | 5/1998 | Zampetti |
| 5,801,970 A * | 9/1998 | Rowland et al. ............... 342/63 |
| 5,810,014 A | 9/1998 | Davis et al. |
| 5,921,937 A | 7/1999 | Davis et al. |
| 5,943,381 A | 8/1999 | Zampetti |
| 5,995,620 A | 11/1999 | Wigren |

(Continued)

FOREIGN PATENT DOCUMENTS

EP 0323688 A1 * 7/1989

*Primary Examiner*—Bernarr E. Gregory
(74) *Attorney, Agent, or Firm*—Duane Morris, LLP

(57) ABSTRACT

A target tracking arrangement predicts the state of a target. The predictor may be a Kalman filter. In the presence of a target which is maneuvering, the prediction may be in error. A maneuver detector is coupled to receive residuals representing the difference between the predictions and the target state. The maneuver detector is matched to the predictor or Kalman filter to thereby tend to reduce the undesirable effects of system noise. The matching may be of the frequency response.

7 Claims, 4 Drawing Sheets

U.S. PATENT DOCUMENTS

| | | | |
|---|---|---|---|
| 6,064,333 A * | 5/2000 | Stromberg | 342/81 |
| 6,243,037 B1 * | 6/2001 | Pulford et al. | 342/95 |
| 6,260,759 B1 * | 7/2001 | Nguyen et al. | 342/90 |
| 6,262,680 B1 * | 7/2001 | Muto | 342/74 |
| 6,377,682 B1 | 4/2002 | Benesty et al. | |
| 6,580,384 B1 * | 6/2003 | Fung et al. | 342/36 |
| 6,683,968 B1 * | 1/2004 | Pavlovic et al. | 342/95 |
| 6,710,743 B2 * | 3/2004 | Benner et al. | 342/453 |
| 6,870,793 B2 * | 3/2005 | Ishihara et al. | 367/104 |
| 6,873,903 B2 * | 3/2005 | Baiada et al. | 342/455 |
| 6,999,601 B2 * | 2/2006 | Pavlovic et al. | 342/95 |
| 2002/0187765 A1 | 12/2002 | Kozak et al. | |
| 2003/0118246 A1 | 6/2003 | August | |
| 2003/0156762 A1 | 8/2003 | August | |
| 2003/0202426 A1 * | 10/2003 | Ishihara et al. | 367/103 |

\* cited by examiner

MATCHED MANEUVER DETECTOR

FIELD OF THE INVENTION

This invention relates to automatic target tracking, and more particularly to target maneuver detection in automatic tracking systems.

BACKGROUND OF THE INVENTION

Automatic tracking systems are widely used for various military and nonmilitary purposes. Among the military purposes are the determination of the locations of airborne, undersea, and seaborne vehicles in a region to be controlled, and the automatic control of weapons directed toward such targets. Air traffic and harbor traffic control are among the civilian or peacetime uses of automatic tracking systems.

FIG. 1 is a simplified block diagram of a prior-art target tracking system 10. In FIG. 1, a sensor or sensor array designated 12 observes a region 14 in which one or more targets T are maneuvering. An arrow 16 illustrates the instantaneous velocity of target T. Sensor 12 may be a radar, sonar, or lidar system, a staring optical array, an acoustic system, or any sensor which is capable of sensing information relating to the position and velocity state of the target T. Sensor 12 may include a receiver in some cases.

State information from sensor 12 of FIG. 1 is coupled by a path 18 to a tracker designated generally as 20. Path 18 may be an electrical, optical or acoustic path, and may carry analog, digital, or other signals. Tracker 20 includes a corrector or estimator 24 which receives difference or residual information from a subtractor or difference signal generator (also known as an error detector) 26, and which processes the signal to produce a better estimate of the state of the target(s). The predicted state of the target is fed back to the inverting (−) input port of subtraction circuit 26 by way of a predictor (into the future) or propagator illustrated as a block 28. The predicted state of the target applied to the inverting input port of the subtracting circuit is compared with the actual sensed state applied to the noninverting (+) input port to produce the residual which is applied to the corrector 24. The corrected state produced by corrector 24 is made available for use, as for example by applying the state information to a display unit 30. The name generally given to a tracker such as 20 of FIG. 1 is "Kalman filter".

Those skilled in the art know that predictors such as 28 of FIG. 1, and the Kalman filter generally, make certain assumptions about the characteristics of the target. For example, a predictor may operate on the assumption that the target's current velocity is the velocity which it will have in the future. If such a predictor is used in a situation in which the target accelerates, the prediction of the future state may be in error. Put another way, the target may maneuver by varying speed, direction, and the like, and such maneuvers may adversely affect the predicted state.

A maneuver detector illustrated as a block 32 is coupled to receive the residual information from error detector 26 of FIG. 1. The purpose of maneuver detector 32 is to declare the presence of maneuvering in the presence of deviation from constant velocity. The output of the maneuver detector 32 is coupled to a utilization apparatus. In the particular case illustrated in FIG. 1, the declaration from the maneuver detector 32 is applied by way of a threshold 34 to the display 30 (as an alternative viewpoint, threshold 34 is part of maneuver detector 32). If the target is not accelerating, the residual is expected to be zero-mean white noise. In the presence of acceleration, the residuals will develop a bias (an average value greater or less than zero) which is indicative of the amount of acceleration. Various types of maneuver detectors have been used in the prior art. Among the prior-art maneuver detectors are those that average the residuals to determine the presence or absence of a bias. Another prior-art scheme uses inverse exponential weighting of residuals, also known as "fading memory." The maneuver detector 32 of FIG. 1, which is coupled to a threshold illustrated as a block 34, which determines if the bias exceeds a given level, and thus exceeding the threshold is indicative of a maneuver by the target. The output of the maneuver detector 32 and threshold 34, if any, is coupled to a utilization apparatus, which may be, for example, display 30, to advise the operator that the indicated track may not be accurate.

FIG. 2 illustrates another prior-art system 200 similar to that of FIG. 1, in which the maneuver declaration information generated by maneuver detector 32 and tested by threshold 34 is applied not only to display 30, but also by way of a path 36 to corrector 24, so that the tracking parameters of the corrector may be adjusted, generally by loosening the bounds, in the presence of a maneuver.

Target tracking with improved or alternative maneuver detection is desired.

SUMMARY OF THE INVENTION

A method for maneuver detection in a target tracking context includes the steps of generating data relating to the state of a target. This data may include position and velocity, velocity and acceleration, or other derivatives or integrals of position and rate of change of position. The method also includes the step of predicting the state of the target at a selected time by use of a predictor having a known response to an instantaneous change in velocity of the target. The state of the target at the selected time is compared with the predicted state, to thereby generate a residual. The residual is detected and filtered with a detector having a response which is ideally identical to, or which is tuned to, impulse (acceleration) response of the residual. In a particularly advantageous mode of the method, the known impulse response includes a low-pass characteristic and is optimal in a theoretical matched filter sense.

DESCRIPTION OF THE INVENTION

The invention is based upon the understanding that the frequency characteristics of the maneuver detector should match the impulse response of the predictor of the Kalman filter tracking system. A maneuver is declared when the value of the output of the matched-filter maneuver detector exceeds a given value or threshold.

In general, the assumption is made for purposes of determining the response of the Kalman filter that the target has been flying with a fixed velocity, and at some moment in time undergoes impulse acceleration. Thus, the target is assumed to change velocity instantaneously from the original fixed velocity to a new velocity. This corresponds to an infinite velocity slope, corresponding to an acceleration impulse. This is a convenient mathematical fiction which allows testing or modeling of the residual response of the Kalman filter. The modeling of the residual response characterizes the frequency response of the residual. The maneuver detector in the prior art looked for a bias in the residual. Noise in such prior-art systems can result in a non-zero value in the residual. In order to avoid false declarations of maneuvers, the maneuver detector must ignore such non-zero values caused by noise. Noise tends to have a higher frequency than a bias caused by true target acceleration. Thus, "low-pass filtering" of the residual in the frequency domain tends to reduce the relative magnitude of noise in the maneuver detector response. The impulse response of the residual of the Kalman filter identifies the maximum possible frequency associated with a true maneuvering target. Thus, matching of the frequency response of the maneuver detector to the impulse response of the residual of the Kalman filter makes the maneuver detector, in principle, sensitive to the residual frequencies associated with targets, but not with noise.

Figure 1:
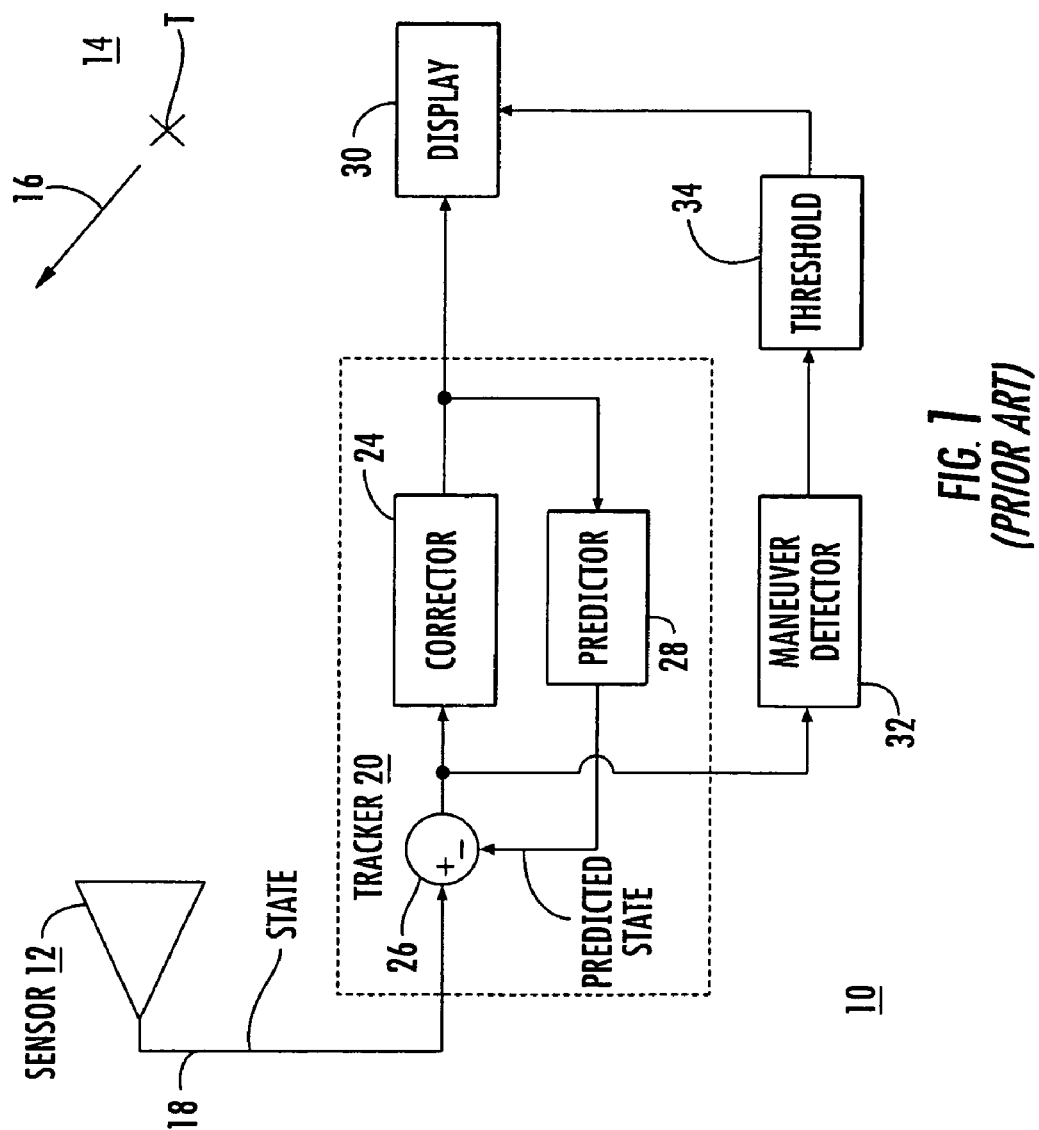
FIG. 1 is a simplified block diagram of a prior-art tracking arrangement including a maneuver detector.
Figure 2:
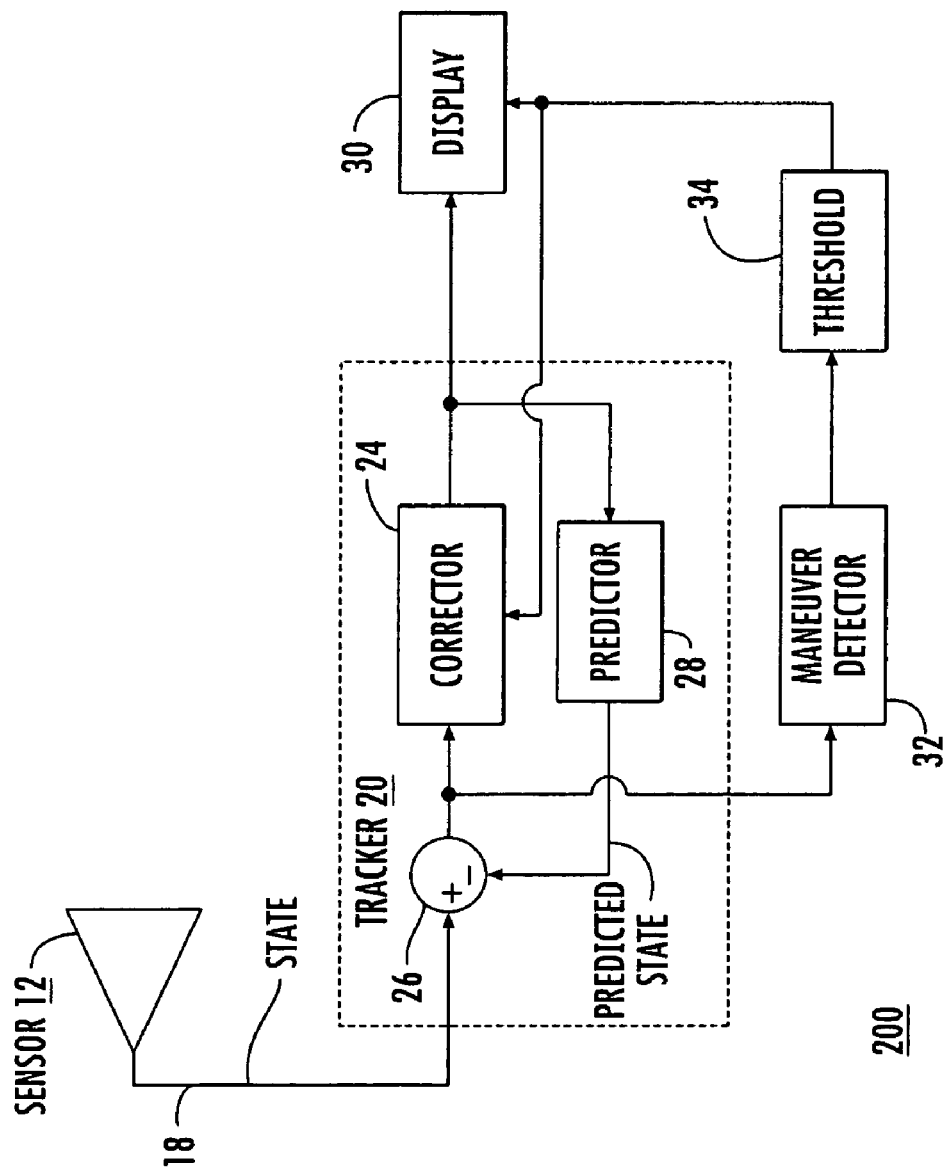
FIG. 2 is a simplified block diagram of a prior-art tracking arrangement similar to that of FIG. 1, in which the output of the maneuver detector is coupled to the corrector.
Figure 3:
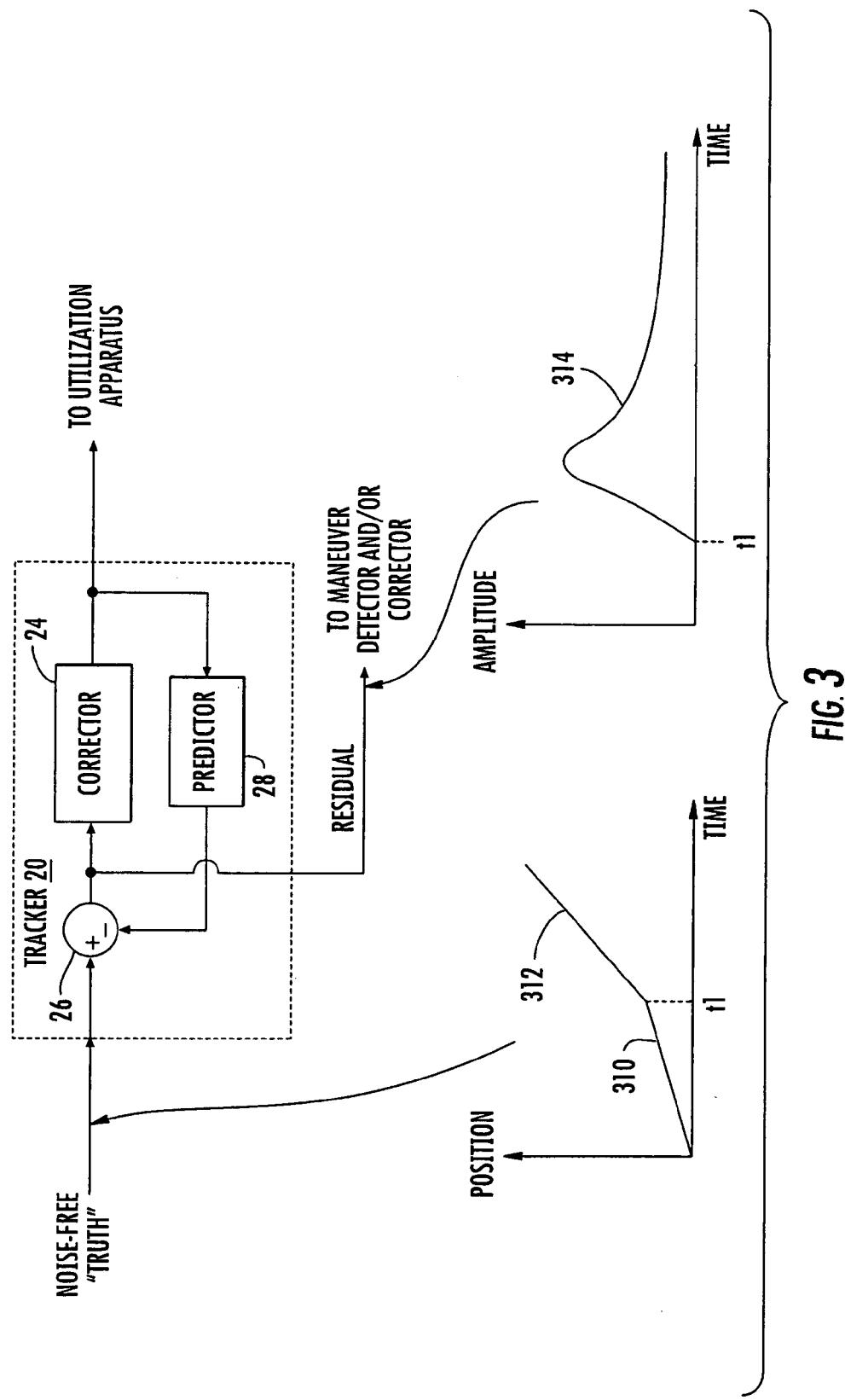
FIG. 3 is a simplified block diagram of a portion of the arrangement of either FIG. 2 or FIG. 3, showing by time plots the position of a target undergoing acceleration and nature of the resulting residuals.

FIG. 3 illustrates the tracker 20 of FIG. 1 or 2 with a noise free test signal deemed to represent the position of the target as a function of time. In FIG. 3, plot portion 310 represents a progressive change of position as a function of time which represents an original fixed velocity. At a time designated $t_2$, an impulse of acceleration is applied to the target, causing a theoretically instantaneous change of velocity to a second velocity, greater than the first. Plot portion 312 of FIG. 3 plots a change of position with time which is greater than that for plot portion 310, representing the greater velocity after application of the acceleration impulse at time $t_1$. Plot 314 of FIG. 3 represents the amplitude of the residuals produced by subtracting circuit 26 in response to the input signals represented by plot 310, 312. Plot 314 has a zero value preceding time $t_1$, since the velocity represented by plot portion 312 is constant. At time $t_1$, plot 314 ramps upward at a rate or slope which is determined by the loop frequency response of the Kalman filter. At some later time, plot 314 reaches a peak value, and then declines toward zero value or amplitude at times much later than $t_1$, as the velocity represented by plot portion 312 becomes the new "fixed velocity."

Figure 4:
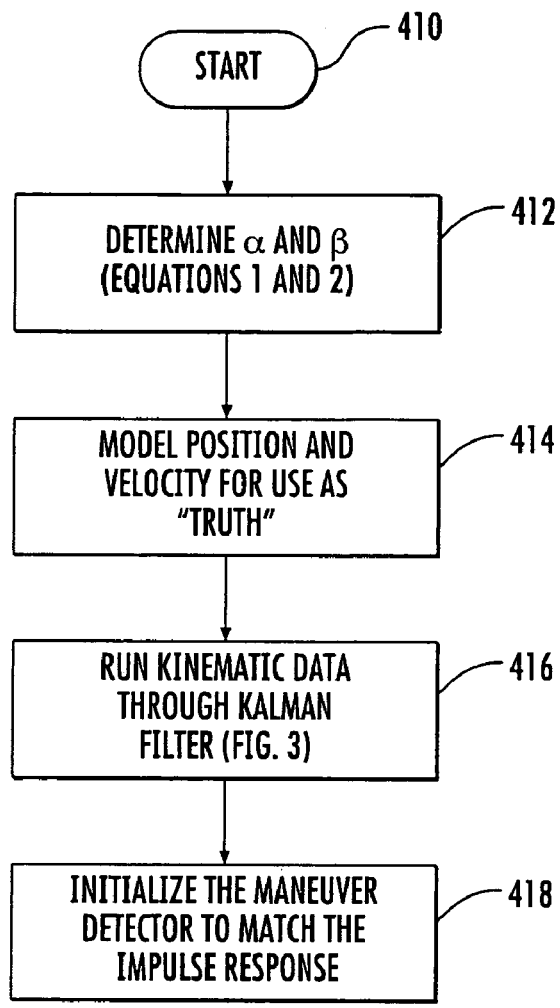
FIG. 4 is a flow diagram or chart illustrating some of the steps according to an aspect of the invention for matching the maneuver detector to the characteristics of the predictor or Kalman filter.

The procedure for determining the impulse response of the Kalman filter is illustrated in the flow diagram of FIG. 4. In FIG. 2, the logic of the method begins at a START block 410, and proceeds to a block 412, representing determination of the impulse response of the Kalman filter. This determination of the impulse response requires a priori determination of the coefficients of the predictor. The first step in determining the coefficients of the predictor in the case of a two-state Kalman filter is to determine the steady-state Kalman gains alpha (a) and beta (i). (Note: Arbitrary values for alpha and beta can also be chosen if an alpha-beta filter is used instead of a Kalman filter.)

$$\beta = 2(2-\alpha) - 4\sqrt{1-\alpha} \quad (1)$$

$$\alpha = -\tfrac{1}{8}(I^2 + 8I - (I+4)\sqrt{I^2 + 8I}) \quad (2)$$

where $I = T^2 \sigma_w / \sigma_m$;

$\sigma_w$ is the process noise uncertainty;

$\sigma_m$ is the measurement uncertainty; and

T is the update interval.

The second step of the a priori determination of the coefficients of the predictor 24 of FIG. 1 is to simulate the position and velocity profile of a target undergoing a modeled acceleration for one time interval. This step is illustrated by block 414 of FIG. 4. Fundamental kinematic equations such as $S = S_0 + V_0 t + \tfrac{1}{2} a t^2$ are used. In one simulation, the modeled acceleration was selected to be one gravitational unit, 9.8 meters/sec$^2$. The time interval, as defined by the number of samples included in the interval, should be selected to be sufficient to not clip the tail of the residual response.

Figure 5:
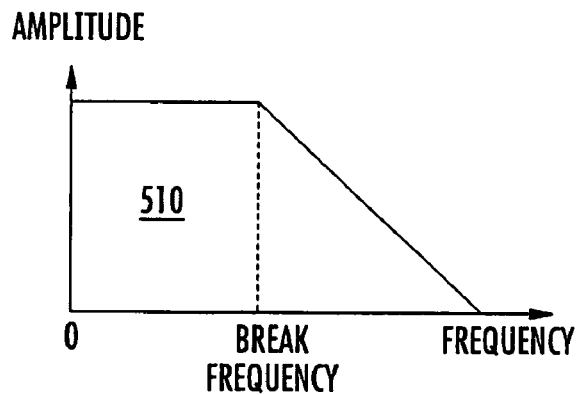
FIG. 5 is an amplitude/frequency plot illustrating a low-pass frequency characteristic.

The "truth" data is then effectively "run through" the Kalman filter to identify the residual response, as set forth by block 416 of FIG. 4. This third step of the a priori determination of coefficients is determination of truth data by the simulation of the processing of the data from the simulated position and velocity with the fixed gain values alpha and beta determined for the filter. Referring to FIG. 3, the incoming truth information, in the form of position data versus time, includes a first portion 310 in which the position increases linearly with time at a first rate represented by the slope of portion 310. At a time designated time t1, the velocity instantaneously changes to a new velocity, greater than the first. This new velocity is represented by portion 312. The change of slope or velocity at time t1 is instantaneous, corresponding to an acceleration impulse. Since these are simulated values, there should be no noise in the resulting residual. The residual resulting from the truth velocity profile is illustrated as plot 414 of FIG. 4. Plot 414 includes a zero-value portion preceding time t1, and a generally peaked response following time t1, decaying back to zero at times much later than t1. The peaked response is an illustration of the limited or low-pass nature of the frequency response of the residuals of the Kalman filter, or in other words the loop response of the Kalman filter. A low-pass frequency characteristic is illustrated as amplitude/frequency plot 510 in FIG. 5. This "running through" step includes calculation of $$\begin{bmatrix} \hat{x}_{k+1} \\ \hat{v}_{k+1} \end{bmatrix} = \begin{bmatrix} 1 & T \\ 0 & 1 \end{bmatrix} \begin{bmatrix} \hat{x}_k \\ \hat{v}_k \end{bmatrix} \quad (3)$$

$$s_{k+1} = x_{k+1,truth} - \hat{x}_{k+1} \quad (4)$$

$$\begin{bmatrix} \tilde{x}_{k+1} \\ \tilde{v}_{k+1} \end{bmatrix} = \begin{bmatrix} \alpha * s_{k+1} \\ \beta * \dfrac{s_{k+1}}{T} \end{bmatrix} + \begin{bmatrix} 1 - \alpha * s_{k+1} & 0 \\ -\beta * \dfrac{s_{k+1}}{T} & 1 \end{bmatrix} \begin{bmatrix} \hat{x}_{k+1} \\ \hat{v}_{k+1} \end{bmatrix} \quad (5)$$

where:

$\tilde{x}_k$ is the corrected (smoothed) position at time k;

$\tilde{v}_k$ is the corrected velocity at time k;

$\hat{x}_{k+1}$ is the predicted position at time k+1;

$\hat{v}_{k+1}$ is the predicted velocity at time k+1;

$s_{k+1}$ is the residual value at time k+1;

$x_{k+1,truth}$ is the true target position at time k+1; and

α and β are the steady-state Kalman filter gains. Equations 3, 4, and 5 together simulate the ideal impulse response of the predictor to a unit acceleration impulse. The frequency response of the Kalman filter is implicit in the calculated result.

The response of the residual of the Kalman filter, illustrated as 314 in FIG. 4 and calculated in equations 3, 4, and 5 can now be normalized, if desired. The response of the residual 314 of the Kalman filter, whether or normalized or not, is the desired result. The response of the maneuver detector 32 of FIG. 1 or 2 is set equal to the response so calculated, as indicated by block 418 of FIG. 4. The implementation of the maneuver detector often involves the use of a transversal filter. Such a filter is made to have an impulse response given by $$y_i = \sum_{j=1}^{k\_max} \text{residual}_{i-j} * s_j \qquad (6)$$

where
$y_i$=matched response; and
k_max is that value of j for which the tail of the response becomes insignificant, which is merely an implementation choice.

A method for maneuver detection in a target tracking context includes the steps of generating data (12, 18) relating to the state (16) of a target (T). This data (12, 18) may include position and velocity (310, 312), velocity and acceleration, or other derivatives or integrals of position and rate of change of position. The method also includes the step of predicting the state of the target at a selected time by use of a predictor (28) having a known response (314) to an instantaneous change in velocity (310, $t_1$, 312) of the target (T). The predictor may be part of a Kalman filter. The state (16) of the target (T) at the selected time is compared with the predicted state, to thereby generate a residual. The residual is detected with a detector (32) having a response, such as a frequency response, identical to the known response (314). In a particularly advantageous mode of the method, the known response includes low-pass frequency characteristics (510).

What is claimed is:

1. A method for maneuver detection in target tracking, comprising the steps of:
    generating data relating to the state of a target;
    predicting from said data the state of said target at a selected time by use of a Kalman predictor having a known frequency response to an instantaneous change in velocity of said target;
    comparing the state of said target at said selected time with said predicted state, to thereby generate a Kalman residual; and
    detecting said Kalman residual with a detector having a frequency response identical to that of said known frequency response.

2. A method according to claim 1, wherein said known frequency response includes low-pass characteristics.

3. A method according to claim 1, wherein said step of generating data relating to the state of a target includes the step of generating data relating to at least one of (a) position and velocity and (b) velocity and acceleration of said target.

4. A method according to claim 1, wherein said step of predicting the state of said target at a selected time by use of a Kalman predictor having a known frequency response to an instantaneous change in velocity of said target includes the step of taking the difference between said data relating to the state of a target and a predicted value.

5. A method according to claim 1, wherein said step of detecting includes the steps of generating a Kalman residual and applying said Kalman residual to a threshold.

6. A method for maneuver detection in target tracking, comprising the steps of:
    generating data relating to velocity state of a target;
    predicting the state of said target from said data by use of a Kalman predictor having a known frequency response to two mutually offsetting instantaneous changes in velocity of said target;
    comparing the state of said target at said selected time with said predicted state, to thereby generate a Kalman residual; and
    detecting said Kalman residual with a detector having a frequency response identical to that of said known response.

7. A method according to claim 6, wherein said step of predicting the state of said target from said data by use of a Kalman predictor having a known frequency response to two mutually offsetting instantaneous changes in velocity of said target includes the step of using a Kalman predictor having a known frequency response to an impulse acceleration.

* * * * *